3,250,590
PREPARATION OF ACTINIDE MONOCARBIDE
Edward J. Petkus, Chicago, and Arthur D. Tevebaugh, Hinsdale, Ill., assignors to the United States of America as represented by the United States Atomic Energy Commission
Filed Apr. 21, 1965, Ser. No. 449,905
5 Claims. (Cl. 23—14.5)

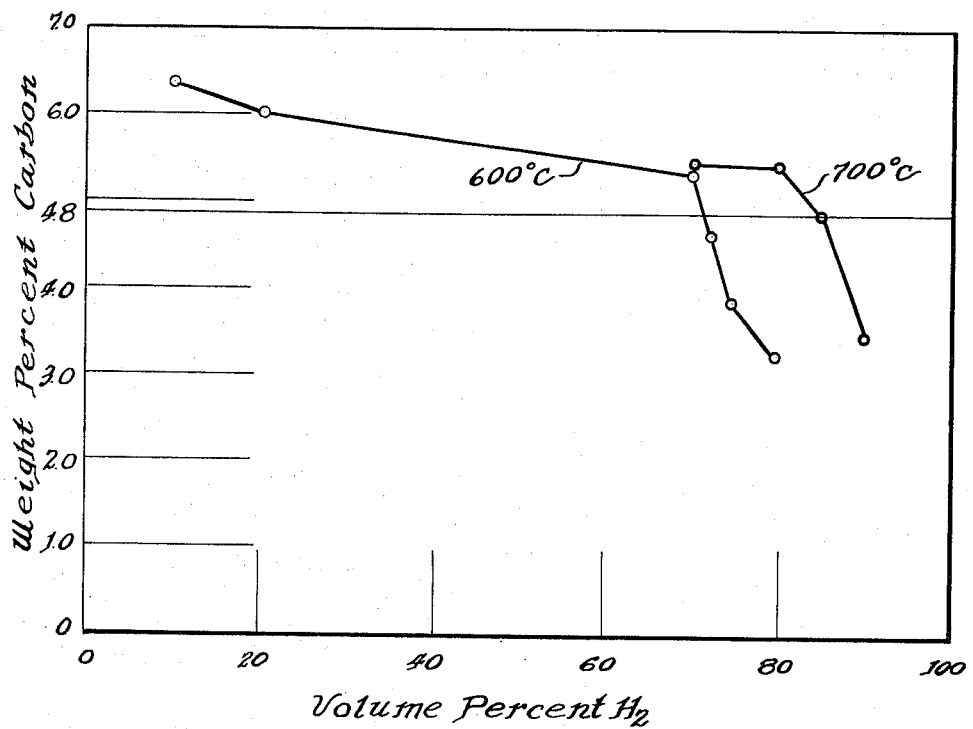

The invention described herein was made in the course of, or under, a contract with the United States Atomic Energy Commission.

This invention relates to the preparation of actinide monocarbide which is used as fuel for some nuclear reactors. The invention is particularly concerned with the production of uranium monocarbide in which the carbon is present in practically stoichiometric quantities. "Stoichiometric monocarbide" is preferred to higher carbides of uranium, because it has a higher uranium concentration and also because it is more inert to the customary cladding materials than are the higher carbides.

Among other processes used heretofore for the production of actinide monocarbide is a static method in which stationary uranium hydride is reacted with a hydrocarbon at elevated temperature. This method is patented to the assignee in U.S. Patent No. 2,534,676, granted to Amos S. Newton et al. on December 19, 1950.

The static method has several drawbacks. During the reaction the uranium powder sinters, so that a complete conversion of the uranium metal is impossible; the hydrocarbon vapors cannot penetrate the sintered surface layer, and consequently the hydrocarbon reacts with the latter to an excessive degree, forming $UC_2$, while the layers underneath the sintered one do not react at all. This results in a rather nonuniform product.

It is an object of this invention to provide a process for the preparation of actinide monocarbide in which sintering does not take place and a uniform product of stoichiometric composition is obtained.

It has been found that a uniform nonsintered product is obtained if the actinide metal is reacted with a gaseous hydrocarbon-hydrogen mixture in a so-called fluidized bed rather than with the metal in stationary condition. (A fluidized bed is obtained by passing a gas upwardly through a bed of solid particles at a sufficient velocity to separate the particles from each other and to maintain them out of contact. In this condition a certain degree of freedom to move is imparted to the solid particles so that the solid-gas mixture behaves much like a liquid and has the ability to flow under the influence of a hydrostatic head.) It has been furthermore found that the hydrogen concentration in said vapor mixture is critical as to the carbon content of the product and that, with said critical hydrogen concentration, a product of the theoretical carbon content, which is 4.8% by weight, is obtained.

This relationship between hydrogen content of the reaction gas and carbon content of the product is shown in the accompanying drawing in which the results of two series of experiments carried out at 600 and at 700° C., respectively, are summarized. The experimental details of these experiments will be given in the example below. It will be seen from this diagram that at 600° C. the very narrow hydrogen range of 70 to 73% by volume of hydrogen yields a stoichiometric monocarbide, while at 700° C. the range of between 84 and 87% by volume of hydrogen leads to the desired result.

The process of this invention thus comprises converting finely divided actinide metal into a fluidized condition at between 600 and 700° C. with a gaseous mixture of hydrogen and hydrocarbon in which the hydrogen content of the gas phase ranges from 70 to 87% by volume at atmospheric pressure, whereby actinide monocarbide is formed.

As far as the reaction proper is concerned, the particle size of the actinide metal is not critical, and therefore it can be derived from any source available. Actinide metal powder has been used satisfactorily; it was prepared by alternately hydriding and dehydriding, as is known to those skilled in the art; in that case the actinide can be introduced as the metal or the hydride, the latter being decomposed at about 450° C. However, because too fine a particle size is too readily entrained with the gas current, which is undesirable, metal powder of a particle size above about five microns is preferred.

Various aliphatic hydrocarbons that either are gaseous or can be readily converted into vapor form are suitable for the process of this invention. Thus, methane, ethane, propane and butane are satisfactory. At 600° C. propane was the preferred hydrocarbon, because it was found to react faster than the others.

The flow rate of the gas is not critical. For the experiments that led to this invention, a flow rate of between 0.25 and 1 ft./sec. was used satisfactorily.

The actinide metal or hydride, as the case may be, was usually used as the material of the fluidized bed. However, as is known to those skilled in the art, inert materials, such as alumina, can be mixed with the actinide material.

In the following, an example is given to illustrate the findings and process of this invention. The results of this example are summarized in the accompanying drawing, as has been mentioned above.

*Example*

A number of runs, one series at 600° C. and one at 700° C., were carried out each using 100 grams of powdered uranium metal, a hydrogen-propane mixture at a flow rate of 0.25 ft./sec., but varying hydrogen concentrations in the hydrogen-propane mixture. The reactions were carried out for between five and six hours. The various products were analyzed for their carbon content, and the findings were plotted against the respective hydrogen concentrations as shown in the drawing. It will be noted from the diagrams that the theoretical carbon composition of 4.8% is met by the 600° C. curve at a hydrogen content of about 72 vol. percent and by the 700° C. curve at about 86 vol. percent of hydrogen.

It will be understood that the invention is not to be limited to the details given herein but that it may be modified within the scope of the appended claims.

What is claimed is:
1. A process of preparing actinide monocarbide, comprising converting finely divided actinide metal into a fluidized condition at between 600 and 700° C. by introducing a gaseous hydrogen-hydrocarbon mixture as the fluidization and reaction gas, and restricting the hydrogen content of said gas mixture to between 70 and 87% by volume, whereby actinide monocarbide is formed.

2. The process of claim 1 wherein the hydrocarbon is propane.

3. The process of claim 2 wherein the actinide is uranium.

4. The process of claim 1 wherein the reaction temperature is 600° C. and the hydrogen content between 70 and 73% by volume.

5. The process of claim 1 wherein the reaction temperature is 700° C. and the hydrogen content of the gas mixture is between 84 and 87% by volume.

References Cited by the Examiner

UNITED STATES PATENTS 2,534,676  12/1950  Newton et al. _____ 23—14.5
2,580,349  12/1951  Fisher _____ 23—14.5

FOREIGN PATENTS 955,708  4/1964  Great Britain.

References Cited by the Applicant

UNITED STATES PATENTS 2,534,676  12/1950  Newton et al.

OTHER REFERENCES

MPIF–ASM Powder Metallurgy Symposium National Metals Congress, New York, October–November 1962, NSA 17:34361.

LEON D. ROSDOL, *Primary Examiner.*

M. J. SCOLNICK, *Assistant Examiner.*